United States Patent
Ooishi et al.

(10) Patent No.: US 9,716,270 B2
(45) Date of Patent: Jul. 25, 2017

(54) ELECTRODE MATERIAL, ELECTRODE, AND LITHIUM ION BATTERY

(71) Applicant: Sumitomo Osaka Cement Co., Ltd., Tokyo (JP)

(72) Inventors: Kenta Ooishi, Funabashi (JP); Takao Kitagawa, Funabashi (JP)

(73) Assignee: SUMITOMO OSAKA CEMENT CO., LTD, Tokyo (JP)

( * ) Notice: Subject to any disclaimer, the term of this patent is extended or adjusted under 35 U.S.C. 154(b) by 0 days.

(21) Appl. No.: 14/698,266

(22) Filed: Apr. 28, 2015

(65) Prior Publication Data

US 2016/0093878 A1   Mar. 31, 2016

Related U.S. Application Data

(63) Continuation of application No. 14/632,680, filed on Feb. 26, 2015.

(30) Foreign Application Priority Data

Sep. 30, 2014   (JP) .................................. 2014-201789

(51) Int. Cl.
  *H01M 4/36*      (2006.01)
  *H01M 4/587*     (2010.01)
  *H01M 4/58*      (2010.01)
  *H01M 4/62*      (2006.01)
  *H01M 10/0525*   (2010.01)
  *H01M 4/02*      (2006.01)

(52) U.S. Cl.
  CPC .......... *H01M 4/366* (2013.01); *H01M 4/5825* (2013.01); *H01M 4/625* (2013.01); *H01M 10/0525* (2013.01); *H01M 2004/021* (2013.01)

(58) Field of Classification Search
  CPC .............................. H01M 4/366; H01M 4/625
  See application file for complete search history.

(56) References Cited

U.S. PATENT DOCUMENTS

| 2007/0054187 A1 | 3/2007 | Nuspl et al. | |
| 2010/0261063 A1* | 10/2010 | Kitagawa | C01B 25/37 429/232 |
| 2010/0323245 A1 | 12/2010 | Liang | |
| 2012/0025149 A1 | 2/2012 | Liang et al. | |
| 2012/0028122 A1* | 2/2012 | Kohmoto | C01B 25/45 429/221 |
| 2013/0140497 A1 | 6/2013 | Nuspl et al. | |
| 2013/0260245 A1* | 10/2013 | Kitagawa | H01M 4/625 429/220 |

FOREIGN PATENT DOCUMENTS

| CN | 101209827 A | 7/2008 | |
| CN | 102306783 A | 1/2012 | |
| JP | 2001-15111 | 1/2001 | |
| JP | 4190912 | 12/2008 | |
| JP | 2011-210649 | 10/2011 | |
| JP | 2012-028225 | 2/2012 | |
| JP | WO 2012081383 A1 * | 6/2012 | ............ H01M 4/625 |
| JP | 2013-077377 | 4/2013 | |
| JP | 2013-187032 | 9/2013 | |
| JP | 2013-258036 | 12/2013 | |
| WO | WO2012049723 | 4/2012 | |
| WO | WO2012133581 | 10/2012 | |

OTHER PUBLICATIONS

Extended European Search Report mailed on Oct. 2, 2015, for European Application No. 15000553.6.

* cited by examiner

*Primary Examiner* — Barbara Gilliam
*Assistant Examiner* — Stephan Essex
(74) *Attorney, Agent, or Firm* — Fitch, Even, Tabin & Flannery, LLP

(57) ABSTRACT

An electrode material including electrode active material particles having a carbonaceous film formed on the surfaces thereof in which the coatability of the carbonaceous film can be guaranteed even when a crushing process is carried out, and the rate characteristics and the like are not degraded during charge and discharge, an electrode and a lithium ion battery having excellent charge and discharge characteristics for which the electrode material is used are provided. The electrode material includes electrode active material particles having a carbonaceous film formed on surfaces thereof, and an affinity value to N-methyl-2-pyrrolidone measured through pulse NMR is in a range of 5000 to 20000.

7 Claims, No Drawings

ELECTRODE MATERIAL, ELECTRODE, AND LITHIUM ION BATTERY

This application is a continuation application of pending U.S. application Ser. No. 14/632,680, filed in the U.S. Patent and Trademark Office on Feb. 26, 2015.

BACKGROUND OF THE INVENTION

Field of the Invention

The present invention relates to an electrode material, an electrode, and a lithium ion battery.

Description of Related Art

In recent years, as a battery anticipated to have small size, light weight, and high capacity, a non-aqueous electrolytic solution-based secondary battery such as a lithium ion battery has been proposed and put into practical use. The lithium ion battery is constituted of a cathode and a negative electrode which allow the reversible insertion and removal of lithium ions, and a non-aqueous electrolyte.

Regarding a negative electrode material for lithium ion batteries, as a negative electrode active material, generally, a lithium-containing metal oxide allowing the reversible insertion and removal of lithium ions such as a carbon-based material or lithium titanate ($Li_4Ti_5O_{12}$) is used.

On the other hand, regarding a cathode material for lithium ion batteries, as a cathode active material, generally, a lithium-containing metal oxide allowing the reversible insertion and removal of lithium ions such as lithium iron phosphate ($LiFePO_4$) or an electrode material mixture including a binder or the like is used. In addition, the cathode in the lithium ion battery is formed by applying the electrode material mixture to the surface of a metal foil called a current collector.

Compared with secondary batteries of the related art such as lead batteries, nickel-cadmium batteries, and nickel-hydrogen batteries, lithium ion batteries have a lighter weight, a smaller size, and higher energy, and thus are used not only as small-size power supplies but also as large-size stationary emergency power supplies in portable electronic devices such as mobile phones and notebook personal computers.

In addition, recently, studies have been underway regarding the use of lithium ion batteries as high-output power supplies for plug-in hybrid vehicles, hybrid vehicles, and electric power tools, and batteries used as the high-output power supplies are required to have high-speed charge and discharge characteristics.

However, in these lithium ion batteries, there is a problem in that, for example, the electron conductivity of electrode materials including an electrode active material such as a Li-containing metal oxide allowing the reversible insertion and removal of lithium ions is low. Therefore, in order to increase the electron conductivity of the electrode materials, there has been proposed an electrode material for which the surfaces of electrode active material particles are covered with an organic compound that is a carbon source, and then are fired, whereby a carbonaceous film is formed on the surfaces of the electrode active material particles through the carbonization of the organic compound, and carbon in the carbonaceous film is interposed as an electron conductive substance (Patent Document 1). In addition, the technique of cathode active material miniaturization has been proposed to improve the insertion and removal reaction of lithium ions to enable the lithium ion batteries to be applied for the applications requiring high power (Patent Document 2).

PRIOR ART DOCUMENTS

Patent Documents

Patent Document 1: Japanese Laid-open Patent Publication No. 2001-15111
Patent Document 2: Japanese Patent No. 4190912

SUMMARY OF THE INVENTION

However, in a case in which an electrode material is crushed using a jet mill or the like, when the crushing strength is too strong, the electrode material, particularly, a carbonaceous film on the material surface is damaged, the carbonaceous film becomes uneven due to the peeling or the like of carbon, and consequently, there have been problems of a decrease in electron conductivity in the electrode material and an increase in resistance in the insertion and removal reaction of lithium ions during the final phase of charge and discharge. Meanwhile, there have additional problems in that there is no means to evaluate the crushed state of the electrode material, and there are no methods to determine the optimal crushing conditions other than the measurement and determination of the charge and discharge characteristics of the actually-crushed electrode material.

The present invention has been made to solve the above-described problems, and an object of the present invention is to provide an electrode material including electrode active material particles having a carbonaceous film formed on the surfaces in which the coatability of the carbonaceous film can be guaranteed even when a crushing process is carried out, and the rate characteristics and the like are not degraded during charge and discharge, and an electrode and a lithium ion battery having excellent charge and discharge characteristics for which the electrode material is used.

Regarding electrode active material particles having a carbonaceous film formed on the surfaces, the present inventors found that, when the affinity value to a specific solvent of an electrode material obtained by crushing agglomerated particles and the like that are formed by bonding a plurality of primary particles is measured through pulse NMR, it is possible to obtain an index of the crushing process conditions, and completed the present invention.

That is, the present invention provides the following electrode material, electrode, and lithium ion battery.

[1] An electrode material including agglomerated particles formed by agglomerating a plurality of primary particles having a carbonaceous film formed on surfaces of electrode active material particles, in which an affinity value to N-methyl-2-pyrrolidone measured through pulse NMR is in a range of 5000 to 20000.

[2] The electrode material according to [1], in which an average particle diameter is in a range of 0.3 μm to 5.0 μm.

[3] The electrode material according to [1] or [2], in which the electrode material is obtained by crushing, using a crusher, a granulated body in which the agglomerated particles formed by agglomerating a plurality of the primary particles having a carbonaceous film formed on the surfaces of the electrode active material particles gather.

[4] The electrode material according to any one of [1] to [3], in which the electrode active material particles are particles made of $LiFePO_4$ or $LiFe_xM_{1-x}PO_4$ (here, M represents one or more selected from a group consisting of Co, Mn, and Ni, and $0<x<1$).

[5] An electrode including the electrode material according to any one of [1] to [4].

[6] A lithium ion battery including a cathode made using the electrode according to [5].

According to the present invention, it is possible to provide an electrode material including agglomerated particles of electrode active material particles having a carbonaceous film formed on the surfaces in which the coatability of the carbonaceous film can be guaranteed even when a crushing process is carried out, and the rate characteristics and the like are not degraded during charge and discharge, and an electrode and a lithium ion battery having excellent charge and discharge characteristics for which the electrode material is used.

DETAILED DESCRIPTION OF THE INVENTION

Hereinafter, the present invention will be described in detail.

Electrode Material

An electrode material of the present invention includes electrode active material particles having a carbonaceous film formed on the surfaces thereof, in which the affinity value to N-methyl-2-pyrrolidone measured through pulse nuclear magnetic resonance (pulse NMR) is in a range of 5000 to 20000.

In the pulse NMR method, the spin (magnetism) state of a subject is observed, and the time taken for the subject to return to the steady state (spin-spin relaxation time) from immediately after the addition of energy (excited state) is measured. In a case in which the subject is a solvent, the relaxation time of solvent molecules (hydrogen atom nuclei) is measured; however, in a particle dispersion fluid, the relaxation time varies depending on the state of particles in the solvent. This is because the relaxation time is affected by the amount of the solvent molecules coming into contact with the particles. Here, the amount of the solvent molecules coming into contact with the particles is considered to be affected and changed by the surface area of the particles or the influence of wettability between the solvent and the particles. Therefore, it is possible to perceive the interface state between the solvent and the particles by measuring the relaxation time of the solvent in a dispersion fluid in which specific particles are dispersed using pulse NMR, and thus it is possible to analyze the minute state change of the particle surfaces from the relaxation time of the solvent molecules.

In the present invention, the relaxation time is considered as the "affinity value" to a solvent for which a value standardized using the specific surface area of particles and the concentration of the particles of a dispersion fluid is used, and is used as an index of the interface state between a solvent and particles, that is, the minute state change of the particle surfaces.

The affinity value A is expressed by Equation (1) described below.

$$A = \frac{R_{SP}}{S_{tot}} \quad (1)$$

In the equation described above, $R_{SP}$ represents the relaxation time equivalent value of a particle surface adsorption fluid, and $S_{tot}$ represents the total specific surface area. In addition, $R_{SP}$ and $S_{tot}$ are respectively expressed by Equation (2) and Equation (3), and consequently, the affinity value A is expressed by Equation (4).

$$R_{sp} = \frac{R_{av} - R_b}{R_b} \quad (2)$$

$$S_{tot} = \frac{S_{BET} \cdot \rho_{wt}/\rho_s}{(1 - \rho_{wt})/\rho_b} \quad (3)$$

$$= S_{BET} \cdot \psi_p$$

$$A = \frac{R_{av} - R_b}{R_b \cdot S_{BET} \cdot \psi_p} \quad (4)$$

In the equations described above, $R_{av}$ and $R_b$ respectively represent the inverse numbers of the relaxation times of a sample and a blank, and $\rho_{wt}$, $\rho_s$, and $\rho_b$ respectively represent the densities of the sample, particles, and the blank. In addition, $S_{BET}$ and $\psi_p$ respectively represent the specific surface area measured using a BET method and the volume concentration of the particles.

Since the carbonaceous film coated electrode active material particles included in the electrode material are covered with a carbonaceous film, the affinity to an organic solvent is significantly different from that of the electrode material surface not coated with carbon. A solvent used in the measurement through pulse NMR is preferably a solvent capable of dispersing the carbonaceous film coated electrode active material particles and a medium including no metal ions; however, as a result of studying a variety of solvents, the present inventors found that, in a case in which N-methyl-2-pyrrolidone (hereinafter, referred to as "NMP") is used as the solvent, the dispersibility of agglomerated particles on which the carbonaceous film is formed is favorable, and furthermore, regarding electrode materials obtained by crushing a granulated body in which agglomerated particles gather using a jet mill or the like, the affinity value increases as the crushing conditions become stronger. This is considered to result from the fact that granules are broken due to the crushing, and thus the contact area with NMP increases and the fact that the carbonaceous film on the electrode active material surfaces is peeled off, and the exposed area of the electrode active material increases. Therefore, it was found that it is possible to obtain an index of crushing process conditions by measuring the affinity value to NMP of the crushed electrode material through pulse NMR.

In the present invention, the affinity value of the electrode material measured through pulse NMR when N-methyl-2-pyrrolidone is used as the solvent is in a range of 5000 to 20000. When the affinity value is less than 5000, the electrode material is not sufficiently crushed, and the particle diameter of the electrode material is too large, and thus it is not possible to improve the rate characteristics. On the other hand, when the affinity value exceeds 20000, a lot of the carbonaceous film is peeled off from the electrode material, and thus the charge and discharge characteristics deteriorate.

The affinity value to the NMP is preferably in a range of 5500 to 19000, and more preferably in a range of 6000 to 18000.

The dispersion liquid of the electrode material used in the measurement can be obtained by mixing 10 to 10,000 parts by mass of NMP to 1 part by mass of the carbonaceous film coated electrode active material particles. Particularly, the amount of NMP with respect to 1 part by mass of the carbonaceous film coated electrode active material particles is more preferably 999 parts by mass since the measurement error is small.

In addition, it is also possible to compute the coating ratio of the carbonaceous film by measuring the relaxation times of particles made only of carbon and (uncoated) active material particles without carbon, producing a standard curve on the basis of the relaxation times, and comparing them with the relaxation times of specimens.

In addition, in the electrode material of the present invention, it is possible to set the particle diameter in a desired range while the peeling of the carbonaceous film due to the crushing is suppressed to the minimum extent, and thus it is possible to obtain the fine powder of an electrode material having excellent rate characteristics without deteriorating the conductivity of the electrode material. As a result, it is considered that a lithium ion battery including an electrode for which the electrode material of the present invention is used as a cathode has excellent charge and discharge characteristics.

Hereinafter, individual elements constituting the electrode material and the forms of the electrode material will be described in detail.

Electrode Active Material Particles

The electrode material of the present invention includes electrode active material particles.

Examples of an electrode active material constituting the electrode active material particles include lithium cobaltate, lithium nickelate, lithium manganate, lithium titanate, and $Li_xA_yD_zPO_4$ (here, A represents one or more selected from a group consisting of Co, Mn, Ni, Fe, Cu, and Cr, D represents one or more selected from a group consisting of Mg, Ca, S, Sr, Ba, Ti, Zn, B, Al, Ga, In, Si, Ge, Sc, Y, and rare earth elements, $0<x<2$, $0<y<1.5$, and $0 \leq z<1.5$).

The electrode active material particles preferably include at least one selected from a group consisting of lithium cobaltate, lithium nickelate, lithium manganate, lithium titanate, and $Li_xA_yD_zPO_4$ as a main component.

Here, the main component refers to a component having a content in the total mass of the electrode active material particles of more than 50% by mass.

A is preferably Co, Mn, Ni, or Fe since it is easy to obtain a high discharge potential. D is preferably Mg, Ca, Sr, Ba, Ti, Zn, or Al since it is easy to obtain a high discharge potential.

In addition, the rare earth elements refer to the 15 elements of La, Ce, Pr, Nd, Pm, Sm, Eu, Gd, Tb, Dy, Ho, Er, Tm, Yb, and Lu which belong to the lanthanum series.

Among them, the electrode active material is preferably $Li_xFe_yD_zPO_4$ (A is Fe), more preferably $Li_xFe_yPO_4$ (A is Fe, and z is 0), and still more preferably $LiFePO_4$.

As the compound represented by $Li_xA_yD_zPO_4$, it is possible to use a compound manufactured using a method of the related art such as a solid phase method, a liquid phase method, or a gas phase method. As $Li_xA_yD_zPO_4$, it is possible to use, for example, particulate $Li_xA_yD_zPO_4$ (in some cases, will be referred to as $Li_xA_yD_zPO_4$ particles).

$Li_xA_yD_zPO_4$ can be obtained by, for example, hydrothermally synthesizing a slurry-form mixture obtained by mixing a Li source, an A source, a P source, water, and, if necessary, a D source, washing the obtained sediment using water so as to generate a precursor substance of the electrode active material, and furthermore firing the precursor substance. During the hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like, and it is preferable to use at least one selected from a group consisting of lithium acetate, lithium chloride, and lithium hydroxide.

Examples of the A source include chlorides, carboxylate salts, hydrosulfate, and the like which include at least one selected from a group consisting of Co, Mn, Ni, Fe, Cu, and Cr. For example, in a case in which A is Fe, examples of a Fe source include divalent iron salts such as iron (II) chloride ($FeCl_2$), iron (II) acetate ($Fe(CH_3COO)_2$), and iron (II) sulfate ($FeSO_4$), and it is preferable to use at least one selected from a group consisting of iron (II) chloride, iron (II) acetate, and iron (II) sulfate.

Examples of the D source include chlorides, carboxylate salts, hydrosulfate, and the like which include at least one selected from a group consisting of Mg, Ca, S, Sr, Ba, Ti, Zn, B, Al, Ga, In, Si, Ge, Sc, Y, and rare earth elements.

Examples of the P source include phosphoric acid compounds such as phosphoric acid ($H_3PO_4$), ammonium dihydrogen phosphate ($NH_4H_2PO_4$), and diammonium phosphate (($NH_4)_2HPO_4$), and it is preferable to use at least one selected from a group consisting of phosphoric acid, ammonium dihydrogen phosphate, and diammonium hydrogen phosphate.

The $Li_xA_yD_zPO_4$ particles may be crystalline particles, amorphous particles, or mixed crystal particles in which crystalline particles and amorphous particles coexist. The $Li_xA_yD_zPO_4$ particles may be amorphous particles since, when thermally treated in a non-oxidative atmosphere at 500° C. to 1000° C., the amorphous $Li_xA_yD_zPO_4$ particles crystallizes.

In addition, in the present invention, the electrode active material particles are preferably particles made of $LiFePO_4$ or $LiFe_xM_{1-x}PO_4$ (here, M represents one or more selected from a group consisting of Co, Mn, and Ni, and $0<x<1$) since, in a case in which the electrode active material particles are used as an electrode material, the effects of the present invention can be more effectively exhibited.

The size of the electrode active material particle is not particularly limited, and the average particle diameter of the primary particles is preferably in a range of 10 nm to 20,000 nm, and more preferably in a range of 20 nm to 5,000 nm.

When the average particle diameter of the primary particles of the electrode active material particles is 10 nm or more, it becomes possible to sufficiently coat the surfaces of the primary particles with the carbonaceous film, a decrease in the discharge capacity at a high-speed charge and discharge rate is suppressed, and it is possible to facilitate the realization of sufficient charge and discharge rate performance. In addition, when the average particle diameter of the primary particles of the electrode active material particles is 20,000 nm or less, the internal resistance of the primary particles does not easily become high, and the discharge capacity at a high-speed charge and discharge rate is not easily impaired.

In the present invention, the average particle diameter refers to the particle diameter D50 at which the cumulative volume percentage reaches 50% in the particle size distribution. In addition, the average particle diameter of the primary particles of the electrode active material particles can be measured by measuring a dispersed body using LB-550 manufactured by Horiba, Ltd., or by observing the electrode active material particles using an electronic microscope, and counting numbers thereof.

The shape of the electrode active material particle is not particularly limited, but is preferably spherical, particularly, truly spherical. When the electrode active material particles are spherical, it is possible to reduce the amount of the solvent when paste for cathodes is prepared using the electrode material of the present invention, and it becomes easy to apply the paste for cathodes to a current collector. The paste for cathodes can be prepared by, for example, mixing the electrode material of the present invention, a binder resin (coupling agent), and a solvent.

In addition, when the shapes of the electrode active material particles are spherical, the surface area of the electrode active material particles is minimized, it is possible to set the blending amount of the binder resin (coupling agent) added to the electrode material to the minimum amount, and it is possible to decrease the internal resistance of the obtained cathode, which is preferable.

Furthermore, when the shapes of the electrode active material particles are spherical, it is easy to closely pack the electrode active material, and thus the amount of a cathode material loaded per unit volume increases, and thus it is possible to increase the electrode density. As a result, it is possible to increase the capacity of the lithium ion battery, which is preferable.

Carbonaceous Film

In the electrode material of the present invention, the carbonaceous film coats the electrode active material particles.

The carbonaceous film is obtained by carbonizing an organic compound that serves as a raw material of the carbonaceous film. The organic compound that serves as a raw material of the carbonaceous film will be described in detail.

In the present invention, the carbonaceous film is almost uniformly formed on the surfaces of the electrode active material particles, but the primary particles of the electrode active material turn into agglomerated particles, furthermore, a granulated body, and turn into an electrode material after the subsequent crushing step, and thus the carbonaceous film on the electrode active material surface is not completely uniform at all times. An index of the uniformity is the affinity value to a specific solvent measured through the above-described pulse NMR.

The film thickness of the carbonaceous film is in a range of 0.1 nm to 10.0 nm, and the average film thickness is preferably in a range of 2.0 nm to 7.0 nm.

When the average film thickness of the carbonaceous film is 2.0 nm or more, the sum of the migration resistance of electrons in the carbonaceous film does not easily increase, an increase in the internal resistance of the battery is suppressed, and it is possible to prevent the voltage drop at a high-speed charge and discharge rate. When the average film thickness of the carbonaceous film is 7.0 nm or less, the steric hindrance is suppressed when lithium ions diffuse in the carbonaceous film, and the migration resistance of lithium ions becomes small, and consequently, an increase in the internal resistance of the battery is suppressed, and it is possible to prevent the voltage drop at a high-speed charge and discharge rate.

In addition, when the film thickness of the carbonaceous film is 1.0 nm or more, it is easy to hold the average film thickness of the carbonaceous film at 2.0 nm or more, and when the film thickness is 10.0 nm or less, it is easy to suppress the average film thickness at 7.0 nm or less.

Meanwhile, the film thickness of the carbonaceous film can be measured using a transmission electron microscope.

The "internal resistance" refers to the sum of, mainly, the migration resistance of electrons and the migration resistance of lithium ions.

As a method for assessing the internal resistance, for example, a current rest method or the like is used. In the current rest method, the internal resistance is measured as the sum of interconnection resistance, contact resistance, migration resistance of electrons, migration resistance of lithium ions, lithium reaction resistances in the positive and negative electrodes, interelectrode resistance determined by the distance between the positive and negative electrodes, the resistance relating to the solvation and desolvation of the lithium ions, and the solid electrolyte interface (SEI) migration resistance of lithium ions.

The carbonaceous film can be confirmed using the amount of carbon in the electrode material. The amount of carbon in the electrode material is measured using a carbon analyzer.

The amount of carbon in the electrode material is preferably in a range of 0.2% by mass to 10% by mass, more preferably in a range of 0.5% by mass to 6% by mass, and still more preferably in a range of 0.8% by mass to 3% by mass from the viewpoint of lithium ion conductivity.

The electrode active material particles coated with the carbonaceous film (carbonaceous film coated electrode active material particles) form agglomerated particles.

In the agglomerated particles of the carbonaceous film coated electrode active material particles, the primary particles of the carbonaceous film coated electrode active material particles are agglomerated together in a state in which a plurality of the primary particles are in contact with each other. The contact state of the carbonaceous film coated electrode active material particles is not particularly limited, but agglomerated particles in a state in which the contact area between the particles is small, and the contact portions form neck shapes having a small cross-sectional area so that the particles are strongly connected with each other. As described above, when the contact portions between the electrode active material particles of the carbonaceous film coated electrode active material particles form neck shapes having a small cross-sectional area, a structure in which channel-shaped (net-shaped) spaces spread three-dimensionally inside the agglomerated particles is obtained.

The coating ratio of the carbonaceous film in the agglomerated particles of the carbonaceous film coated electrode active material particles is preferably 80% or more. When the coating ratio of the carbonaceous film in the agglomerated body is 80% or more, the coating effect of the carbonaceous film can be sufficiently obtained.

The electrode material of the present invention can be manufactured using an arbitrary method through which the above-described constitution can be obtained, but is preferably manufactured using a method for manufacturing the electrode material of the present invention described below since the electrode material includes the preferable aspect described above.

Method for Manufacturing the Electrode Material

The electrode material of the present invention can be manufactured through, for example, a manufacturing step including a slurry preparation step in which at least an electrode active material particle raw material selected from a group consisting of electrode active materials and precursors of the electrode active materials, an organic compound, and water are mixed, and a slurry having a ratio (D90/D10) of the particle diameter (D90) when the accumulated volume percentage is 90% in the particle size distribution of the electrode active material particle raw material to the particle diameter (D10) when the accumulated volume percentage is 10% in a range of 5 to 30 is prepared, a firing step in which the slurry is dried, and the obtained dried substance is fired at 500° C. to 1000° C. in a non-oxidative atmosphere, and a crushing step in which a granulated body in which agglomerated particles obtained in the firing step gather is crushed using a crusher.

Examples of the electrode active material used for the manufacture of the electrode material include substances described as the electrode active material constituting the electrode active material particles included in the electrode material of the present invention, and the preferable aspect is also the same. Examples of a precursor of the electrode active material also include the precursors listed in the description of the electrode material.

The organic compound used for the manufacture of the electrode material is not particularly limited as long as the compound is capable of forming the carbonaceous film on the surfaces of the electrode active material particles, and examples thereof include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols, trivalent alcohols, and the like.

Regarding the blending ratio between the electrode active material particle raw material and the organic compound, when the total amount of the organic compound is converted to the amount of carbon, the amount of carbon is preferably in a range of 0.6 parts by mass to 4.0 parts by mass, and more preferably in a range of 1.1 parts by mass to 1.7 parts by mass with respect to 100 parts by mass of the electrode active material particle raw material.

When the blending ratio of the organic compound in terms of the amount of carbon is 0.6 parts by mass or more, the discharge capacity at a high-speed charge and discharge rate does not easily become low in a case in which a battery is formed, and it is possible to realize sufficient charge and discharge rate performance. When the blending ratio of the organic compound in terms of the amount of carbon is 4.0 parts by mass or less, the steric hindrance is small when lithium ions diffuse in the carbonaceous film, and the lithium ion migration resistance becomes small. As a result, the internal resistance of the battery does not easily increase in a case in which a battery is formed, and it is possible to suppress the voltage drop at a high-speed charge and discharge rate.

The electrode active material particle raw material and the organic compound are dissolved or dispersed in water, thereby preparing a homogeneous slurry. During the dissolution or dispersion, a dispersant may be added. The method for dissolving or dispersing the electrode active material particle raw material and the organic compound in water is not particularly limited as long as the electrode active material particle raw material is dispersed, and the organic compound is dissolved and dispersed, and it is preferable to use, for example, a dispersion apparatus such as a planetary ball mill, an oscillation ball mill, a bead mill, a paint shaker, or an attritor.

When the electrode active material particle raw material and the organic compound are dissolved or dispersed in water, it is preferable to disperse the electrode active material particle raw material in a primary particle form, and then add and stir the organic compound so as to be dissolved. Then, the surfaces of the primary particles of the electrode active material particles are easily coated with the organic compound. As a result, the electrode active material particle surfaces are uniformly coated with carbon derived from the organic compound.

When the slurry is prepared, the dispersion conditions of the slurry, for example, the concentrations of the electrode active material particle raw material and the organic compound in the slurry, the stirring time, and the like are appropriately adjusted so that the ratio (D90/D10) of the electrode active material particle raw material falls in a range of 5 to 30. Therefore, it is possible to obtain a volume density of the obtained agglomerated particles in a range of 50% by volume to 80% by volume of the volume density of the solid agglomerated particles.

Next, the slurry is sprayed and dried in a high-temperature atmosphere, for example, in the atmosphere at 70° C. to 250° C.

Next, the dried substance is fired in a non-oxidative atmosphere at a temperature in a range of 500° C. to 1000° C., and preferably in a range of 600° C. to 900° C. for 0.1 hours to 40 hours.

The non-oxidative atmosphere is preferably an inert atmosphere of nitrogen ($N_2$), argon (Ar), or the like, and in a case in which it is necessary to further suppress oxidization, a reducing atmosphere including approximately several % by volume of a reducing gas such as hydrogen ($H_2$) is preferred. In addition, for the purpose of removing organic components evaporated in the non-oxidative atmosphere during firing, a susceptible or burnable gas such as oxygen ($O_2$) may be introduced into an inert atmosphere.

When the firing temperature is set to 500° C. or higher, it is easy to sufficiently decompose and react the organic compound included in the dried substance, and it is easy to sufficiently carbonize the organic compound. As a result, it is easy to prevent the generation of a decomposed substance of the organic compound having a high resistance in the obtained agglomerate. When the firing temperature is set to 1000° C. or lower, Li in the electrode active material is not easily evaporated, and the grain growth of the electrode active material is suppressed. As a result, it is possible to prevent the discharge capacity at a high-speed charge and discharge rate from becoming low, and it is possible to realize sufficient charge and discharge rate performance.

In the firing step, it is possible to control the particle size distribution of the granulated body of agglomerated particles by appropriately adjusting the firing conditions of the dried substance, for example, the rate of temperature rise, the maximum holding temperature, and the holding time. The average particle diameter of the granulated body is preferably in a range of 0.5 μm to 100 μm, and more preferably in a range of 1 μm to 20 μm. The average particle diameter was measured using a laser diffraction particle size distribution measurement instrument (SALD-1000, manufactured by Shimadzu Corporation). The average particle diameter of the electrode material described below is also measured in the same manner.

Next, at least a part of the granulated body is crushed.

Here, "at least a part of the granulated body is crushed" means that at least a part of the granulated body may be crushed, and it is not necessary to crush the entire granulated body.

The proportion of the amount (crushed particles) of the granulated body to be crushed in the total amount of the granulated body is determined depending on characteristics required for the agglomerated particles obtained by crushing the granulated body to be used as an electrode material, and thus cannot be generally determined; however, in a case in which the agglomerated particles are applied to high-output power supplies requiring high-speed charge and discharge characteristics or high-capacity power supplies requiring a high energy density, the proportion is preferably in a range of 20% by mass to 80% by mass, and more preferably in a range of 30% by mass to 70% by mass.

An apparatus used for the crushing of the granulated body does not need to fully crush the granulated body, and simply needs to crush only a part of the granulated body, and, for example, an air flow-type fine crusher such as a dry-type ball mill, a wet-type ball mill, a mixer, or a jet mill, an ultrasonic crusher, or the like can be used.

In the present invention, with the affinity to NMP measured through pulse NMR set in a desired range, a jet mill is preferably used during crushing, and the amount of the granulated body injected into the jet mill is set in a range of 10 kg/min to 30 kg/min, the crushing pressure is preferably set in a range of 0.3 MPa to 0.7 MPa, and the air pressure is preferably set in a range of 0.03 MPa to 0.55 MPa.

In the crushing step, at least a part of the granulated body is crushed, and a mixture including primary particles having the carbonaceous film formed on the surfaces of the electrode active material particles and agglomerated particles in which a plurality of the primary particles gather as well as the partially-crushed granulated body obtained by crushing a part of the granulated body is obtained.

In the crushing step, the amount of the agglomerated particles generated is suppressed in a range of 20% by mass to 80% by mass of the total amount of the electrode material.

In the crushing of the granulated body, it is also possible to crush the granulated body after a conductive auxiliary agent is added to the granulated body.

As the conductive auxiliary agent, one or more selected from a group consisting of carbon black, acetylene black, amorphous carbon, crystalline carbon, and fibrous carbon, which are carbon sources, are preferably used. The amount of the conductive auxiliary agent added is not particularly limited as long as desired conductivity is imparted to the agglomerated particles. When the agglomerated body is crushed after the addition of the conductive auxiliary agent, it is possible to obtain mixed powder in which the agglomerated particles including the partially-crushed agglomerate and the conductive auxiliary agent are uniformly mixed.

In addition, in the crushing of the granulated body, it is also possible to crush the granulated body after a crushing auxiliary agent is added to the granulated body.

The crushing auxiliary agent is preferably an organic compound, and among organic compounds, organic solvents which serve as a carbon source for the electrode material, and are also used as a slurry for forming cathodes in the subsequent steps such as monovalent alcohols such as methanol, ethanol, and 2-propanol, polyvalent alcohols such as ethylene glycol, and ketones such as acetone are preferred. When the granulated body is crushed after the addition of the crushing auxiliary agent, the organic compound serves as a carbon source, and it is possible to obtain mixed powder in which the agglomerated particles including the partially-crushed agglomerate and the carbon source are uniformly mixed.

Therefore, the electrode material of the present invention can be produced. In the present invention, arbitrary steps other than the above-described steps may be included.

The average particle diameter of the electrode material after the crushing step is preferably in a range of 0.3 µm to 5.0 µm, and more preferably in a range of 0.4 µm to 4.5 µm.

When the average particle diameter is set in the above-described range, it is possible to guarantee the coatability of the carbonaceous film even after the crushing process, and it is possible to obtain an electrode material in which the rate characteristics and the like are not degraded during charge and discharge.

Electrode

An electrode of the present invention includes the electrode material of the present invention.

To produce the electrode of the present invention, the electrode material, a coupling agent made of a binder resin, and a solvent are mixed together, thereby preparing paint for electrode formation or paste for electrode formation. At this time, a conductive auxiliary agent such as carbon black may be added if necessary.

As the coupling agent, that is, the binder resin, for example, a polytetrafluoroethylene (PTFE) resin, a polyvinylidene fluoride (PVdF) resin, fluorine rubber, or the like is preferably used.

The blending ratio of the binder resin to the electrode material is not particularly limited, and, for example, the amount of the binder resin blended is set in a range of 1 part by mass to 30 parts by mass, and preferably in a range of 3 parts by mass to 20 parts by mass with respect to 100 parts by mass of the electrode material.

The solvent used for the paint for electrode formation or the paste for electrode formation may be appropriately selected in accordance with the properties of the binder resin.

Examples thereof include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether, ketones such as acetone, methyl ethyl ketone (MEK), methyl isobutyl ketone (MIBK), acetylacetone, and cyclohexanone, amides such as dimethyl formamide, N, N-dimethylacetamide, and N-methyl pyrrolidone, glycols such as ethylene glycol, diethylene glycol, and propylene glycol, and the like. The solvent may be singly used, or a mixture of two or more solvents may be used.

Next, the paint for electrode formation or the paste for electrode formation is applied to one surface of a metal foil, and then is dried, thereby obtaining a metal foil having a coated film made of a mixture of the electrode material and the binder resin formed on one surface.

Next, the coated film is bonded by pressing, and is dried, thereby producing a current collector (electrode) having an electrode material layer on one surface of the metal foil.

Through the above-described steps, the electrode having excellent charge and discharge characteristics and rate characteristics can be produced.

Lithium Ion Battery

A lithium ion battery of the present invention includes a cathode made of the electrode of the present invention.

In this lithium ion battery, since the electrode is produced using the electrode material of the present invention, it is possible to decrease the internal resistance of the electrode. Therefore, it is possible to suppress the internal resistance of the battery at a low level, and consequently, it is possible to provide a lithium ion battery capable of carrying out high-speed charge and discharge without any concern of the significant drop of voltage.

In the lithium ion battery of the present invention, there is no particular limitation regarding the negative electrode, an electrolytic solution, a separator, and the like. For example, for the negative electrode, it is possible to use a negative electrode material such as Li metal, a carbon material, a Li alloy, or $Li_4Ti_5O_{12}$. In addition, a solid electrolyte may be used in place of the electrolytic solution and the separator.

According to the lithium ion battery of the present invention, since the cathode made using the electrode of the present invention is included, the charge and discharge characteristics and the rate characteristics are excellent.

EXAMPLES

Hereinafter, the present invention will be specifically described using Examples 1 to 5 and Comparative Examples 1 to 3, but the present invention is not limited by the examples.

Example 1

Production of an Electrode Material
Production of a Granulated Body 4 mol of lithium acetate ($LiCH_3COO$), 2 mol of iron (II) sulfate ($FeSO_4$), and 2 mol of phosphoric acid ($H_3PO_4$) were mixed with 2 L (liters) of water so that the total amount reached 4 L, thereby preparing a homogeneous slurry-form mixture.

Next, the mixture was accommodated in a pressure-resistant airtight container having a capacity of 8 L, and was hydrothermally synthesized for 1 hour at 200° C.

Next, the obtained sediment was washed using water, thereby obtaining a cake-form precursor of an electrode active material.

Next, 150 g of the precursor of the electrode active material (in terms of the solid content), a polyvinyl alcohol aqueous solution obtained by dissolving 20 g of polyvinyl alcohol (PVA, the degree of polymerization: 1500) as an organic compound in 200 g of water, an amount of a nonionic surfactant polyoxyethylene lauryl ether that corresponds to 6% by mass of carbon when the total amount of the polyvinyl alcohol is converted to carbon, and 500 g of zirconia balls having a diameter of 5 mm as medium particles were injected into a ball mill, and a dispersion treatment was carried out, thereby obtaining a precursor slurry.

Next, the precursor slurry was sprayed and dried in the atmosphere at 200° C., thereby obtaining dried powder having an average particle diameter of 7 μm.

Next, the obtained dried powder was held in a nitrogen atmosphere at 250° C. for 1 hour, and then was fired at 700° C. for 1 hour, thereby obtaining a granulated body having an average particle diameter of 8.5 μm.

Crushing of the Granulated Body

The obtained granulated body was crushed to an average particle diameter of 0.9 μm using a jet mill apparatus (manufactured by Seishin Enterprise Co., Ltd., SK Jet-O-Mill), thereby obtaining an electrode material 1 of Example 1.

Evaluation of the Affinity of the Electrode Material

The obtained electrode material 1 and N-methyl-2-pyrrolidone (NMP) were mixed so that the mass ratio reached 1:999. The relaxation time was measured using this mixture (dispersion fluid) and a pulse NMR apparatus (manufactured by XiGo Nanotools, Acorn Area). The measured relaxation time was "the relaxation time of a sample", and the inverse number thereof was used as $R_{av}$.

Next, the mixture of the electrode material and NMP was separated into a solid and a liquid using a centrifugal separator, the supernatant was collected, and the relaxation time was evaluated using the pulse NMR apparatus in the same manner. The measured relaxation time was "the relaxation time of a blank", and the inverse number thereof was used as $R_b$.

In addition, as a value necessary for the computation of the affinity, the specific surface area of the electrode material was assessed using a BET method. The value at this time was used as $S_{BET}$. Furthermore, the volume ratios of both the electrode material and NMP in the mixture were obtained from the mass ratios and densities of the electrode material and NMP, and a value computed from [electrode material volume]/[NMP volume] was used as $\psi_p$.

The affinity value A was obtained from the above-described values and Equation (4). As a result, the affinity value of the electrode material 1 was 8990.

Production of an Electrode

The obtained electrode material 1, polyvinylidene fluoride (PVdF) as a binder, and acetylene black (AB) as a conductive auxiliary agent were mixed so that the mass ratio (electrode material 1:PVdF:AB) reached 90:5:5, furthermore, N-methyl-2-pyrrolidone (NMP) was added as a solvent so as to impart fluidity, the components were kneaded for 30 minutes using a kneader (manufactured by Thinky, Awatori Rentaro) under conditions of a revolution of 1200 rpm and a rotation of 800 rpm, thereby producing paste for electrodes.

Next, the paste for electrodes was applied onto a 15 μm-thick aluminum (Al) foil that was a current collector, and was dried. After that, the paste was pressurized at a pressure of 600 kgf/cm², thereby producing a cathode 1 of a lithium ion battery of Example 1.

Production of a Lithium Ion Battery

Lithium metal was disposed as a negative electrode against the cathode 1 of the lithium ion battery, and a separator made of porous polypropylene was disposed between the cathode 1 and the negative electrode, thereby producing a battery member 1.

Meanwhile, ethylene carbonate and diethyl carbonate were mixed together in (a mass ratio of) 1:1, and furthermore 1 M of a $LiPF_6$ solution was added thereto, thereby producing an electrolyte solution 1 having lithium ion conductivity.

Next, the battery member 1 was immersed in the electrolyte solution 1, thereby producing the lithium ion battery 1 of Example 1.

Evaluation of the Lithium Ion Battery

The charge and discharge characteristics and rate characteristics of the lithium ion battery 1 were evaluated respectively. The evaluation methods are as described below.

(1) Charge and Discharge Characteristics

A charge and discharge test of the lithium ion battery 1 was carried out at room temperature (25° C.) under conditions of a cut-off voltage in a range of 2 V to 4.2 V and a constant current with a charge and discharge rate of 0.1 C (10-hour charge and then 10-hour discharge). As a result, the initial discharge capacity was approximately 160 mAh/g.

(2) Rate Characteristics

An evaluation test of the rate characteristics of the lithium ion battery 1 was carried out at room temperature (25° C.) under conditions of a cut-off voltage in a range of 2 V to 4.5 V, a charge rate of 0.1 C, and a discharge rate of 10 C (10-hour charge and then 6-minute discharge). As a result, the discharge capacity was approximately 75 mAh/g.

The results are summarized in Table 1. In Table 1, the discharge capacity of a lithium ion battery in which an electrode material that has not been subjected to a jet mill crushing process (reference example) is used as the standard, cases of excellent discharge capacity compared with the standard are indicated by "A", cases of similar discharge capacity are indicated by "B", and cases of poorer discharge capacity are indicated by "C", and as the comprehensive evaluation, cases in which the 10 C discharge capacity is improved by 5% or more from the discharge capacity of the reference example are indicated by "good", and cases of the improvement of 5% or less are indicated by "no good".

Example 2

The granulated body used in Example 1 was crushed using the same jet mill crushing apparatus as in Example 1 to an average particle diameter of 0.5 μm, thereby producing an electrode material 2 of Example 2, and a cathode 2 and a lithium ion battery 2 were obtained in the same manner.

In addition, the electrode material 2 and the lithium ion battery 2 were evaluated in the same manner as in Example 1. The results are summarized in Table 1.

Example 3

The granulated body used in Example 1 was crushed using the same jet mill crushing apparatus as in Example 1 to an average particle diameter of 4.2 μm, thereby producing an electrode material 3 of Example 3, and a cathode 3 and a lithium ion battery 3 were obtained in the same manner.

In addition, the electrode material 3 and the lithium ion battery 3 were evaluated in the same manner as in Example 1. The results are summarized in Table 1.

Reference Example 1

An electrode material 4 (average particle diameter: 8.5 μm) of Reference Example 1 was produced in the same manner as in Example 1 except for the fact that, in the production of the electrode material, the crushing of the granulated body using the jet mill crushing apparatus was not carried out, and a cathode 4 and a lithium ion battery 4 were obtained in the same manner.

In addition, the electrode material 4 and the lithium ion battery 4 were evaluated in the same manner as in Example 1. The results are summarized in Table 1.

Comparative Example 1

The granulated body used in Example 1 was crushed using the same jet mill crushing apparatus as in Example 1 to an average particle diameter of 5.5 μm, thereby producing an electrode material 5 of Comparative Example 1, and a cathode 5 and a lithium ion battery 5 were obtained in the same manner.

In addition, the electrode material 5 and the lithium ion battery 5 were evaluated in the same manner as in Example 1. The results are summarized in Table 1.

Comparative Example 2

The granulated body used in Example 1 was crushed using the same jet mill crushing apparatus as in Example 1 to an average particle diameter of 0.2 μm, thereby producing an electrode material 6 of Comparative Example 2, and a cathode 6 and a lithium ion battery 6 were obtained in the same manner.

In addition, the electrode material 6 and the lithium ion battery 6 were evaluated in the same manner as in Example 1. The results are summarized in Table 1.

Example 4

Production of an Electrode Material
Production of a Granulated Body 4 mol of lithium acetate ($LiCH_3COO$), 0.5 mol of iron (II) sulfate ($FeSO_4$), 1.5 mol of manganese (II) sulfate ($MnSO_4$), and 2 mol of phosphoric acid ($H_3PO_4$) were mixed with 2 L (liters) of water so that the total amount reached 4 L, thereby preparing a homogeneous slurry-form mixture.

Next, the mixture was accommodated in a pressure-resistant airtight container having a capacity of 8 L, and was hydrothermally synthesized for 1 hour at 200° C.

Next, the obtained sediment was washed using water, thereby obtaining a cake-form precursor of an electrode active material.

Next, 150 g of the precursor of the electrode active material (in terms of the solid content), a polyvinyl alcohol aqueous solution obtained by dissolving 20 g of polyvinyl alcohol (PVA, the degree of polymerization: 1500) as an organic compound in 200 g of water, an amount of a nonionic surfactant polyoxyethylene lauryl ether that corresponds to 6% by mass of carbon when the total amount of the polyvinyl alcohol is converted to carbon, and 500 g of zirconia balls having a diameter of 5 mm as medium particles were injected into a ball mill, and a dispersion treatment was carried out, thereby obtaining a precursor slurry.

Next, the precursor slurry was sprayed and dried in the atmosphere at 200° C., thereby obtaining dried powder having an average particle diameter of 7 μm.

Next, the obtained dried powder was held in a nitrogen atmosphere at 250° C. for 1 hour, and then was fired at 700° C. for 1 hour, thereby obtaining a granulated body having an average particle diameter of 7 μm.

Crushing of the Granulated Body

The obtained granulated body was crushed to an average particle diameter of 0.4 μm using a jet mill apparatus (manufactured by Seishin Enterprise Co., Ltd., SK Jet-O-Mill), thereby obtaining an electrode material 7 of Example 4.

A cathode 7 and a lithium ion battery 7 were produced in the same manner as in Example 1 using the obtained electrode material 7, and the electrode material 7 and the lithium ion battery 7 were evaluated in the same manner as in Example 1. The results are summarized in Table 1.

Example 5

The granulated body used in Example 4 was crushed using the same jet mill crushing apparatus as in Example 1 to an average particle diameter of 3.5 μm, thereby producing an electrode material 8 of Example 5, and a cathode 8 and a lithium ion battery 8 were obtained in the same manner.

In addition, the electrode material 8 and the lithium ion battery 8 were evaluated in the same manner as in Example 1. The results are summarized in Table 1.

Reference Example 2

An electrode material 9 (average particle diameter: 7 μm) of Reference Example 2 was produced in the same manner as in Example 4 except for the fact that, in the production of the electrode material, the crushing of the granulated body using the jet mill crushing apparatus was not carried out, and a cathode 9 and a lithium ion battery 9 were obtained in the same manner.

In addition, the electrode material 9 and the lithium ion battery 9 were evaluated in the same manner as in Example 1. The results are summarized in Table 1.

Comparative Example 3

The granulated body used in Example 4 was crushed using the same jet mill crushing apparatus as in Example 1 to an average particle diameter of 0.15 µm, thereby producing an electrode material 10 of Comparative Example 3, and a cathode 10 and a lithium ion battery 10 were obtained in the same manner.

In addition, the electrode material 10 and the lithium ion battery 10 were evaluated in the same manner as in Example 1. The results are summarized in Table 1.

TABLE 1

|  | Electrode material characteristics | | Discharge capacity (mAh/g) | | | | Comprehensive evaluation |
| --- | --- | --- | --- | --- | --- | --- | --- |
|  | Average particle diameter (µm) | Affinity value to NMP | 0.1 C | Evaluation | 10 C | Evaluation |  |
| Reference Example 1 | 8.5 | 720 | 160 | — | 60 | — | (Standard 1) |
| Example 1 | 0.9 | 8990 | 160 | B | 75 | A | good (favorable rate characteristics) |
| Example 2 | 0.5 | 17800 | 158 | B | 72 | A | good (favorable rate characteristics) |
| Example 3 | 4.2 | 6740 | 160 | B | 65 | A | good(favorable rate characteristics) |
| Comparative Example 1 | 5.5 | 3310 | 160 | B | 60 | B | no good (same as standard) |
| Comparative Example 2 | 0.2 | 22700 | 153 | C | 55 | C | no good (Low and high rate characteristics deteriorate) |
| Reference Example 2 | 7.0 | 810 | 158 | — | 58 | — | (Standard 2) |
| Example 4 | 0.4 | 15200 | 158 | B | 63 | A | good (favorable rate characteristics) |
| Example 5 | 3.5 | 7020 | 157 | B | 64 | A | good (favorable rate characteristics) |
| Comparative Example 3 | 0.15 | 21900 | 158 | B | 53 | C | no good (High rate characteristics deteriorate) |

According to the above-described results, it is found that, in the electrode materials of Examples 1 to 3, compared with the electrode material of Comparative Example 1, crushing was carried out using the jet mill, and thus the affinity value to NMP was increased, and consequently, the rate characteristics and the like were improved. On the other hand, in Comparative Example 1 in which the affinity value to NMP did not reach 5000 even after jet mill crushing was carried out or Comparative Example 2 in which the conditions for the jet mill crushing were too strong, and thus the affinity value to MNP exceeded 20000, the rate characteristics were similar or inferior to those of Reference Example 1, and the improvement effect could not be obtained.

In addition, regarding the electrode materials of Examples 4 and 5 and Comparative Example 3 in which the compositions of the electrode materials were different, the same results were obtained.

From the above-described results, it has been found that it becomes possible to optimize the crushing conditions of an electrode material for improving charge and discharge characteristics or rate characteristics when a battery has been produced by using the affinity value to NMP measured through pulse NMR as an index.

The present invention is available for use in cathode materials for batteries, furthermore, electrode materials used as cathode materials for lithium ion batteries, electrodes including the electrode material, and lithium ion batteries including a cathode made using the electrode.

What is claimed is:

1. An electrode material comprising:
   a mixture obtained by partially crushing a granulated body comprising a carbonaceous film formed on surface of electrode active material particles, the mixture comprising a partially-crushed granulated body, primary particles comprising the carbonaceous film formed on surfaces of the electrode active material particles, and agglomerated particles in which a plurality of the primary particles gather,
   wherein an average particle diameter of the electrode material is 0.3 µm to 4.5 µm,
   wherein an affinity value to N-methyl-2-pyrrolidone of the electrode material measured through pulse NMR is in a range of 5000 to 20000,
   wherein the carbonaceous film is substantially uniformly formed on the surfaces of the electrode active material particles,
   wherein a film thickness of the carbonaceous film is in a range of 0.1 nm to 10.0 nm,
   wherein a coating ratio of the carbonaceous film in the carbonaceous film coated electrode active material particles is 80% or more,
   wherein an amount of carbon in the electrode material is in a range of 0.8% by mass to 3% by mass, and wherein a ratio of discharge capacity (10 C/0.1 C) is 0.39 or more.

2. The electrode material according to claim 1,
wherein the electrode active material particles are particles made of $LiFePO_4$ or $LiFe_xM_{1-x}PO_4$ (here, M represents one or more selected from a group consisting of Co, Mn, and Ni, and 0<x<1).

3. An electrode comprising:
the electrode material according to claim 1.

4. A lithium ion battery comprising:
a cathode made using the electrode according to claim 3.

5. The electrode material according to claim 1, wherein the affinity value is an index of the degree of uniform formation of the carbonaceous film on the surfaces of the electrode active material particles.

6. The electrode material according to claim 1, wherein the crusher is a fine crusher.

7. An electrode material comprising:
a mixture by partially crushing a granulated body comprising a carbonaceous material coated on first primary particles and second primary particles of an electrode active material, the mixture comprising:
a partially-crushed granulated body,
crushed particles comprising a film of a carbonaceous material coated on the first primary particles of an electrode active material, and
agglomerated particles comprising a film of the carbonaceous material coated on the second primary particles of the electrode active material, wherein the agglomerated particles include a plurality of the second primary particles connected with each other,
wherein an average particle diameter of the electrode material is 0.3 μm to 4.5 μm, and an affinity value to N-methyl-2-pyrrolidone of the electrode material measured through pulse NMR is in a range of 5000 to 20000, and
wherein a ratio of discharge capacity (10 C/0.1 C) is 0.39 or more.

* * * * *